US 9,270,075 B2

(12) United States Patent
Leproux et al.

(10) Patent No.: US 9,270,075 B2
(45) Date of Patent: Feb. 23, 2016

(54) PULSED SUPERCONTINUUM SOURCE OF VARIABLE PULSE DURATION

(75) Inventors: Philippe Leproux, Saint Pardoux (FR); Vincent Couderc, Verneuil sur Vienne (FR); Yves Hernandez, Taisnieres sur Hon (FR); Anthony Bertrand, Lille (FR); Marco Andreana, Limoges (FR); Stephane Hilaire, Limoges (FR); Philippe Roy, Limoges (FR)

(73) Assignees: UNIVERSITE DE LIMOGES, Limoges (FR); LEUKOS, Limoges (FR); MULTITEL, Mons (FR)

(*) Notice: Subject to any disclaimer, the term of this patent is extended or adjusted under 35 U.S.C. 154(b) by 0 days.

(21) Appl. No.: 13/639,666

(22) PCT Filed: Apr. 8, 2011

(86) PCT No.: PCT/FR2011/050805
§ 371 (c)(1),
(2), (4) Date: Nov. 15, 2012

(87) PCT Pub. No.: WO2011/124867
PCT Pub. Date: Oct. 13, 2011

(65) Prior Publication Data
US 2013/0058366 A1    Mar. 7, 2013

(30) Foreign Application Priority Data
Apr. 8, 2010 (FR) ..................... 10 52662

(51) Int. Cl.
*H01S 3/30* (2006.01)
*H01S 3/10* (2006.01)
(Continued)

(52) U.S. Cl.
CPC ......... *H01S 3/06758* (2013.01); *G02B 6/02333* (2013.01); *G02B 6/02347* (2013.01);
(Continued)

(58) Field of Classification Search
CPC .............. H01S 3/06758; H01S 3/2333; H01S 3/10046; H01S 3/1618; H01S 3/0092; G02B 6/0233; G02B 6/02347; G02B 6/02361
USPC ..................................................... 372/6, 25
See application file for complete search history.

(56) References Cited

U.S. PATENT DOCUMENTS

| 6,091,749 A * | 7/2000 | Hoffmaster et al. ....... 372/38.02 |
| 2004/0146075 A1* | 7/2004 | Kennedy et al. ................ 372/10 |

(Continued)

FOREIGN PATENT DOCUMENTS

| EP | 1980885 A1 | 10/2008 |
| GB | 2386434 A | 9/2003 |

OTHER PUBLICATIONS

Bertrand et al., "Laser a Fibre Amplifie a 1060 NM Parametrable en Frequence et en Duree D'Impulsion: Resultats a 1 MHz, 500 PS", Amplificateurs et Lasers a Fibre, 2008, pp. 172-174, XP-002603077.
Coen et al., "White-light supercontinuum generation with 60-ps pump pulses in a photonic crystal fiber", Optics Letters, 2001, vol. 26, No. 17, pp. 1356-1358, XP002603282.
(Continued)

*Primary Examiner* — Yuanda Zhang
(74) *Attorney, Agent, or Firm* — Young & Thompson

(57) ABSTRACT

A supercontinuum source capable of emitting waves between the infrared range and the ultraviolet range, includes a pulsed laser source (12) capable of generating a laser beam and a non-linear microstructured optical fiber (14) capable of receiving the laser beam, in such a way that the supercontinuum source is capable of generating a beam (F') over a pulse duration (T'), characterized in that the supercontinuum source includes elements for varying the pulse duration.

9 Claims, 5 Drawing Sheets

Figure 1:
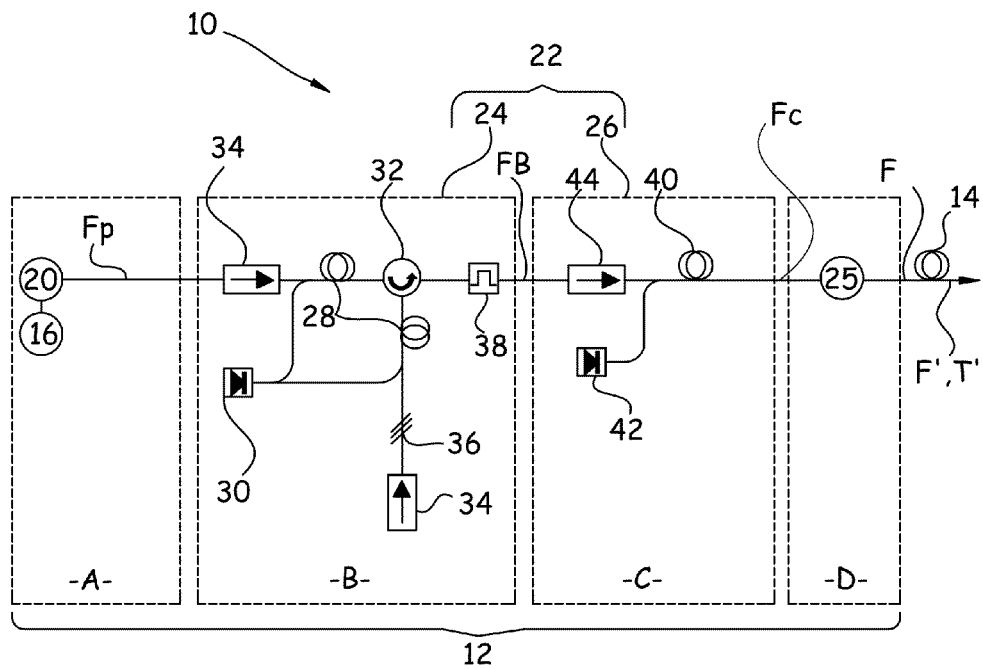

(51) Int. Cl.
*H01S 3/067* (2006.01)
*G02B 6/02* (2006.01)
*H01S 3/00* (2006.01)
*H01S 3/16* (2006.01)
*H01S 3/23* (2006.01)

(52) U.S. Cl.
CPC ........... *G02B6/02361* (2013.01); *H01S 3/0092* (2013.01); *H01S 3/10046* (2013.01); *H01S 3/1618* (2013.01); *H01S 3/2333* (2013.01)

(56) References Cited

U.S. PATENT DOCUMENTS

2004/0213302 A1* 10/2004 Fermann et al. .................. 372/6
2006/0104582 A1* 5/2006 Frampton et al. ............. 385/123
2010/0040335 A1* 2/2010 Thomsen ...................... 385/122

OTHER PUBLICATIONS

Database Inspec, "Adjustable supercontinuum laser source with low coherence length and low timing jitter", The Institution of Engineering and Technology, 2010, XP002603079.
Dudley et al., "Supercontinuunn generation in photonic crystal fiber", Reviews of Modern Physics, vol. 78, Oct.-Dec. 2006, vol. 78, No. 4, pp. 1135-1184, XP-002603078.
Provino et al., "Compact broadband continuum source based on microchip lase pumped microstructured fibre", Electronics Letters, 2001, vol. 37, No. 9, XP006016516.
International Search Report, dated Sep. 2, 2011, from corresponding PCT application.

* cited by examiner

PULSED SUPERCONTINUUM SOURCE OF VARIABLE PULSE DURATION

BACKGROUND OF THE INVENTION

This invention relates to a supercontinuum source that is capable of emitting waves between the infrared range and the ultraviolet range.

The supercontinuum sources, developed over several years, have numerous applications, in particular in spectroscopy, metrology, or else medical imagery.

DESCRIPTION OF THE RELATED ART

One known supercontinuum source generally comprises a laser source that is capable of generating a laser beam and a non-linear microstructured optical fiber that is capable of receiving said laser beam.

By way of example, the document GB-2,386,434 describes on page 45 a method of manufacturing by extrusion of a non-linear microstructured optical fiber. However, the invention is not limited to this embodiment, and other manufacturing methods can be used to obtain a non-linear microstructured optical fiber.

According to the invention, there is particular interest in a supercontinuum source that comprises a pulsed laser source, such that the supercontinuum source is capable of generating a beam during a given pulse duration.

The publications entitled "White-Light Supercontinuum Generation with 60-ps Pump Pulses in a Photonic Crystal" and "Compact Broadband Continuum Source Based on Microship Laser Pumped Microstructured Fibre" describe a pulsed supercontinuum source.

Nevertheless, the sources that are described in these documents or in existing documents cannot be parameterized, and consequently, it is necessary to change the supercontinuum source according to the characteristics that it is desired to obtain.

According to another drawback of the supercontinuum sources described in these publications, the operating range is limited and does not extend from the infrared range to the ultraviolet range.

The publication entitled "Laser à fibre amplifiée à 1060 nm paramétrable en fréquence et en durée d'impulsion: résultats à 1 MHz et 500 ps [Fiber Laser Amplified to 1,060 nm that is Parameterizable in Frequency and Pulse Duration: Results at 1 MHz and 500 ps]" describes a means for parameterizing the pulse duration.

Thus, this document more precisely describes a first stage that comprises a source in the form of a continuous laser diode whose beam is modulated externally by an independent electro-optical modulator and two successive amplification stages. However, the laser beam that is obtained from this source is not applied to a non-linear microstructured optical fiber.

If the teaching of this last publication is used in the supercontinuum sources described in the first publications, it is not possible to obtain a pulsed supercontinuum source with an operating range that extends from the infrared range to the ultraviolet range.

SUMMARY OF THE INVENTION

The object of this invention is to propose a parameterizable supercontinuum source that is capable of emitting waves from the infrared range to the ultraviolet range.

For this purpose, the invention relates to a supercontinuum source that is capable of emitting waves extending from the infrared range to the ultraviolet range, comprising a pulsed laser source that is capable of generating a laser beam and a non-linear microstructured optical fiber, capable of receiving said laser beam, in such a way that the supercontinuum source is capable of generating a beam during a given pulse duration, characterized in that the supercontinuum source comprises means for varying said pulse duration.

BRIEF DESCRIPTION OF THE DRAWING FIGURES

Figure 2:
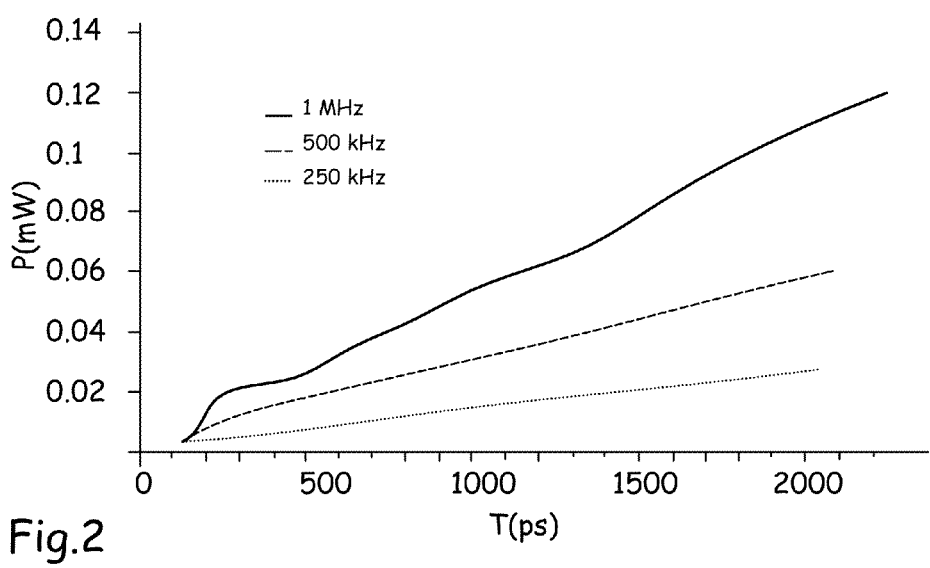
Figure 3:
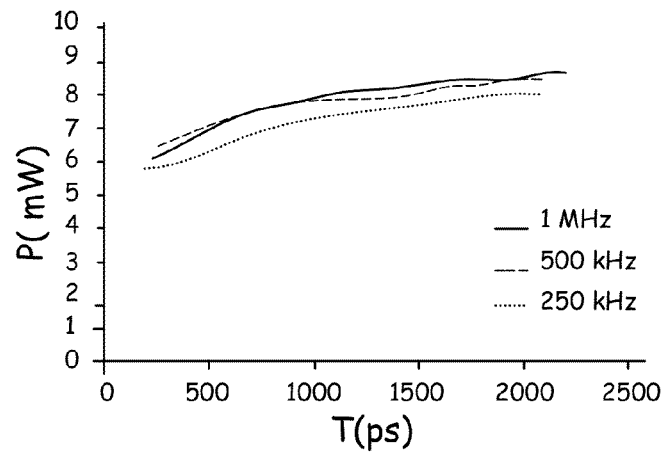
Figure 4A:
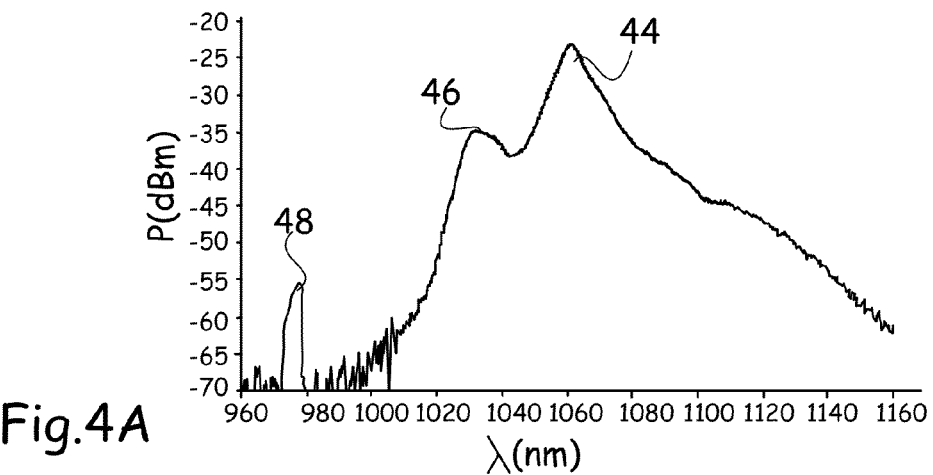
Figure 4B:
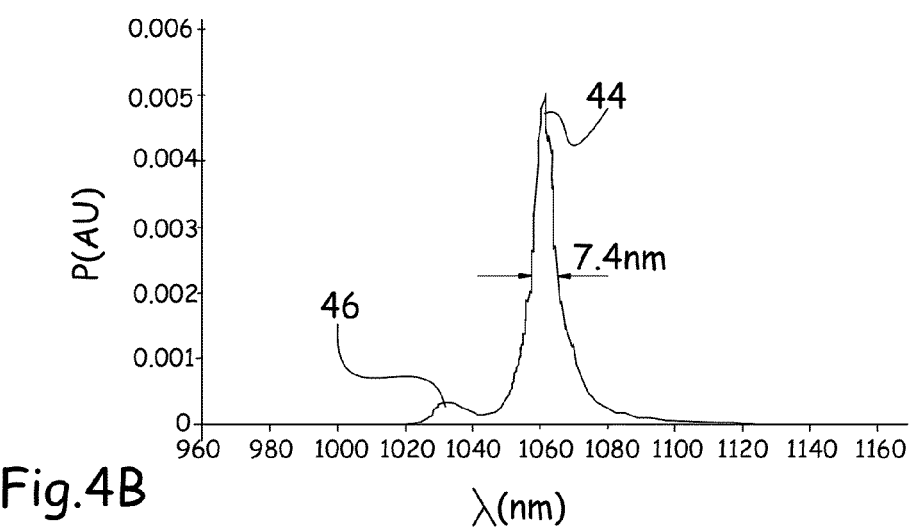
Figure 5:
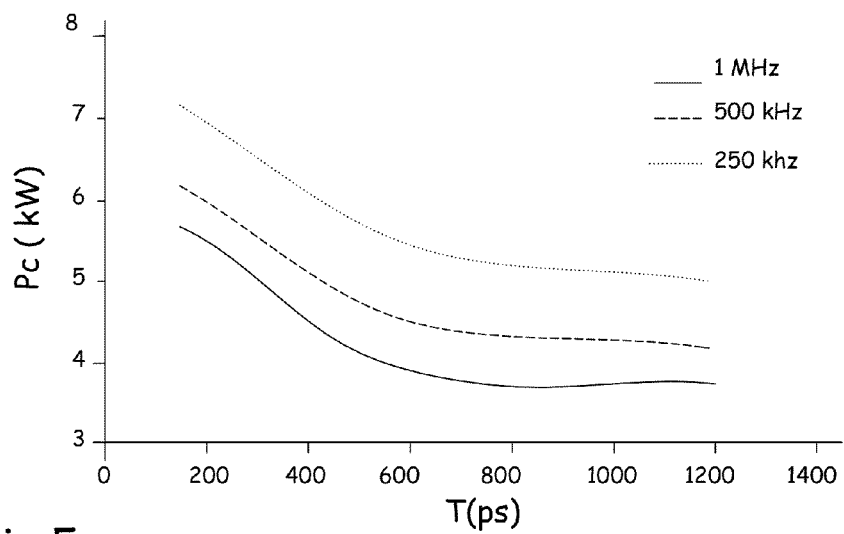
Figure 6A:
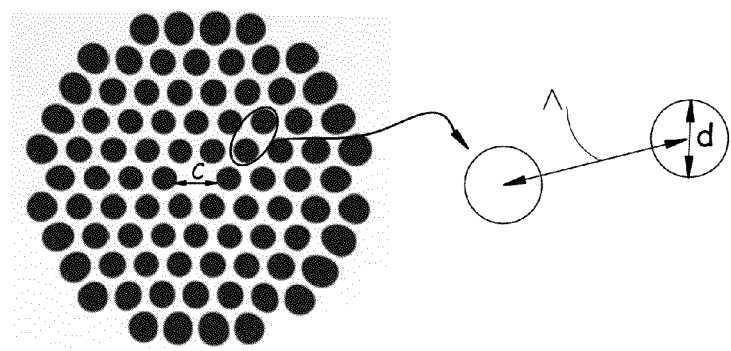
Figure 6B:
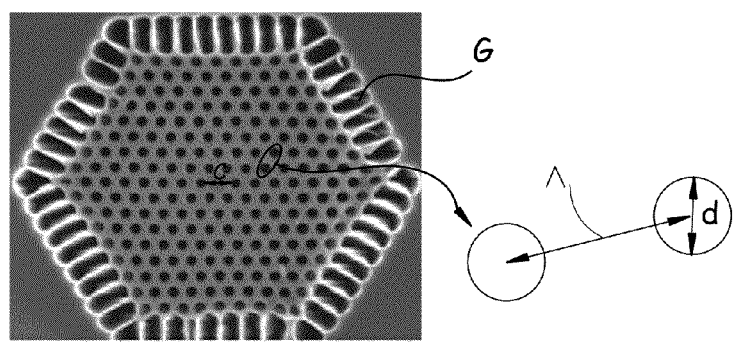
Figure 7A:
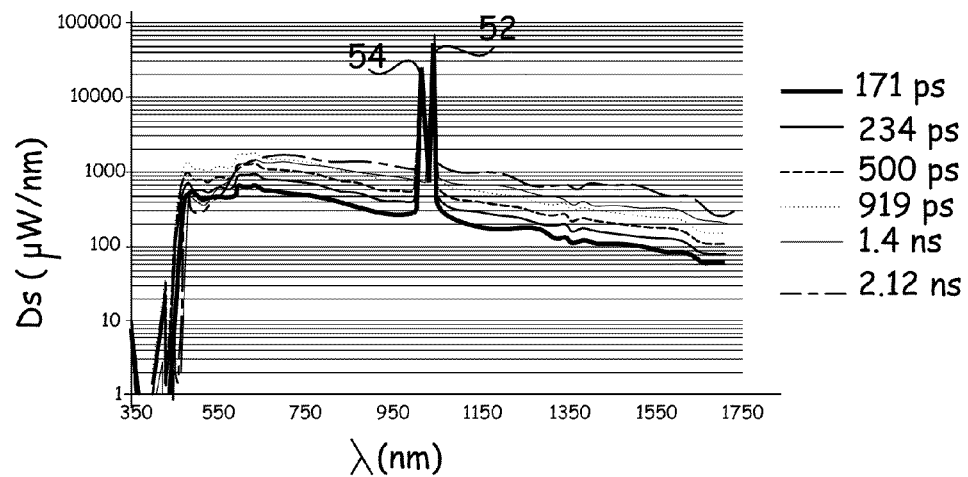
Figure 7B:
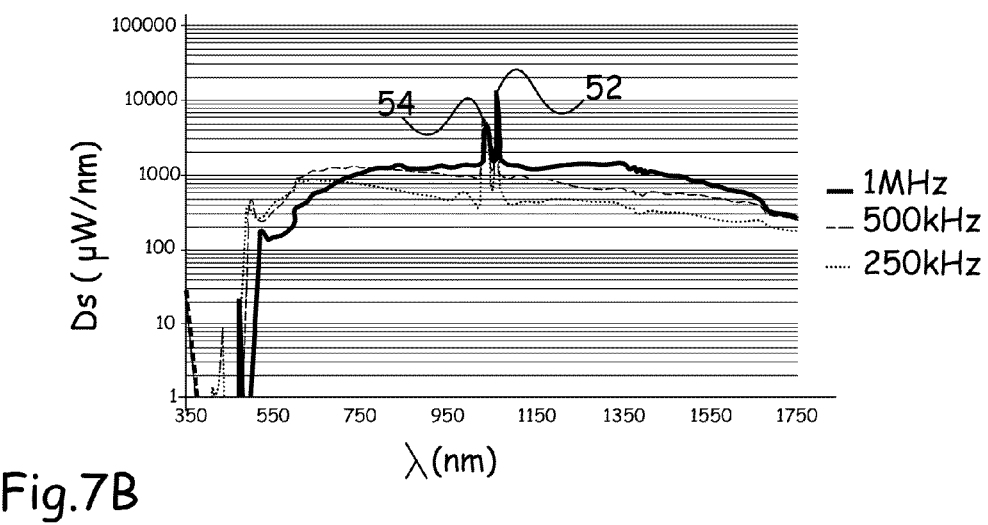
Figure 8:
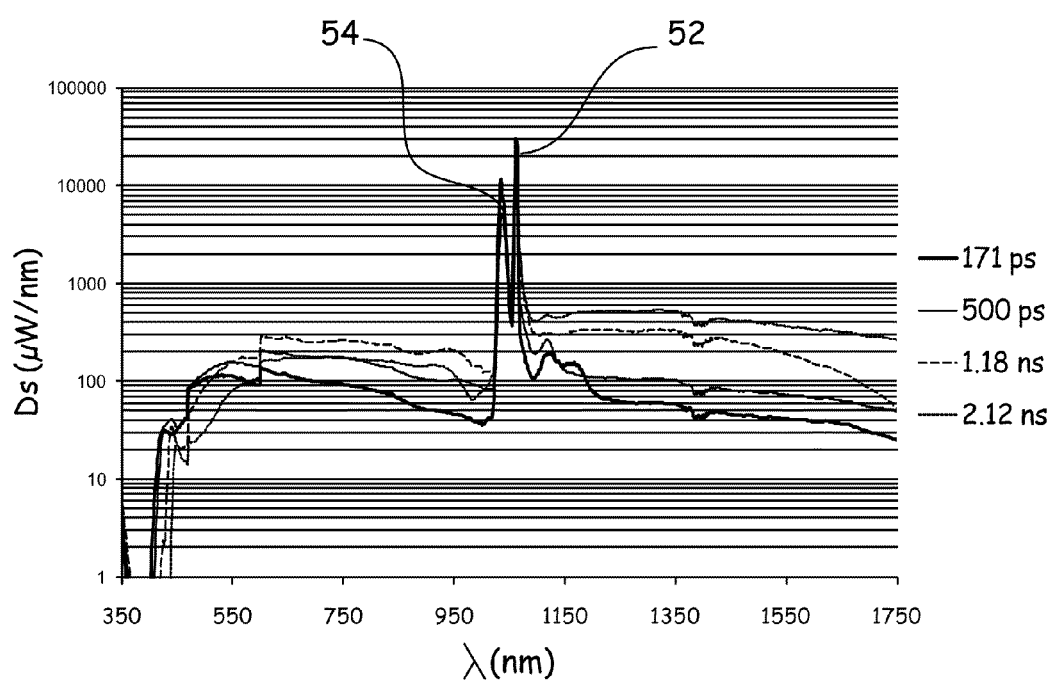

The invention will now be described in more detail with reference to the accompanying figures that are provided only by way of example and in which:

FIG. 1 is a diagrammatic representation of the mounting of a supercontinuum source according to the invention, FIG. 2 is a representation of the power (expressed in terms of mW) of a laser source of the supercontinuum source of FIG. 1 as a function of the pulse duration (in ps), FIG. 3 is a representation of the power (in mW) at the output of the preamplifier module as a function of the pulse duration (in ps), FIG. 4A is a spectral representation of the power of the supercontinuum source of FIG. 1 on a Log scale (in dBm) as a function of wavelength (expressed in nm) in a wavelength range of 960 nm to 1,160 nm, FIG. 4B is a representation of the power of the supercontinuum source of FIG. 1 on a linear scale (in UA) as a function of wavelength (expressed in nm) in a wavelength range of 960 nm to 1,160 nm, FIG. 5 is a representation of the calculated peak value power (in kW) as a function of the pulse duration (in ps), FIG. 6A is a representation of a cross-section of a first non-linear microstructured fiber for the mounting of FIG. 1, FIG. 6B is a representation of a cross-section of another non-linear microstructured fiber for the mounting of FIG. 1, FIG. 7A is a representation of the spectral power density (expressed in $\mu$W/nm) of the supercontinuum source of FIG. 1 with a fiber in accordance with FIG. 6A as a function of wavelength (expressed in nm), in a wavelength range of 350 nm to 1,750 nm, for different pulse durations, and measured experimentally, FIG. 7B is a representation of the spectral power density (expressed in $\mu$W/nm) of the supercontinuum source of FIG. 1 with a fiber in accordance with FIG. 6A as a function of wavelength (expressed in nm), in a wavelength range of 350 nm to 1,750 nm, for different repetition frequencies, and measured experimentally, and FIG. 8 is a representation of the spectral power density (expressed in $\mu$W/nm) of the supercontinuum source of FIG. 1 with a fiber in accordance with FIG. 6A as a function of wavelength (expressed in nm), in a wavelength range of 350 nm to 1,750 nm, for pulse durations of between 171 ps and 2.12 ns, and measured experimentally.

DETAILED DESCRIPTION OF THE INVENTION

In FIG. 1, a supercontinuum source that is capable of emitting waves between the infrared range and the ultraviolet range is shown at 10. The source 10 comprises a pulsed laser source 12 that is capable of generating a laser beam F and a non-linear microstructured optical fiber 14 that is capable of receiving the laser beam F. The supercontinuum source 10 is able to generate a beam F' for a given pulse duration, denoted T'.

Supercontinuum source is defined as an optical source whose spectrum is wide and that has spatial consistency characteristics that are identical to those of a laser. A continuous polychromatic source is also mentioned.

According to the invention, the supercontinuum source comprises means 16 for varying the pulse duration T' of the waves emitted by the supercontinuum source 10.

It is noted that the beam F' can be emitted at a variable repetition frequency, as will be described later, i.e., the source 10 emits wave trains, each wave train having a duration T'.

This varying of the pulse duration makes the supercontinuum source 10 adaptable to various applications, without requiring any mounting change.

According to another characteristic of the invention, the laser source 12 comprises a pump laser source 20 that is capable of emitting a pump beam Fp and illustrated in the block A of FIG. 1.

According to another characteristic of the invention, the laser source 12 comprises amplification means 22 of the pump beam Fp.

The amplification means 22 comprise a preamplifier module 24 that is illustrated by the block B of FIG. 1, in such a way that the beam FB has an amplified power of between 15 dB and 30 dB.

The amplification means 22 also comprise an amplifier module 26 that is illustrated by the block C of FIG. 1, at the output of the preamplifier module 24, in such a way that the power of the beam FC at the output of the module 26 is between 1 W and 3 W.

According to another characteristic of the invention, the laser source 12 also comprises an output optical fiber 25, connected to the output of the block C and illustrated by the block D of FIG. 1, whose function will be presented in detail below, and to the output of which the input of the microstructured fiber 14 is connected.

The block A of FIG. 1 will now be described in detail.

The pump laser source 20, called pump below, is preferably a semi-conductive laser that integrates means 16 for varying the pulse duration of the pump beam Fp.

Preferably, the pump laser source 20 has a wavelength of 1,060 nm.

The fact that the source is modulated internally and comprises means 16 of the pulse duration makes it possible to obtain a wide operating range extending from the infrared range to the ultraviolet range for the thus constituted supercontinuum source.

A laser diode, for example sold under the reference LUMICS LU1055M200, is particularly suitable, and the pulse duration T of the pump beam Fp of such a pump is continuously adjustable between 200 ps and 2 ns.

This laser diode has a parameterizable repetition frequency of between 1 Hz and 1 MHz.

As can be seen in FIG. 2, the power supplied by the pump, denoted P, is a rising linear function of the pulse duration, denoted T, whose slope increases with the repetition frequency, respectively 1 MHz (continuous line), 500 kHz (broken line), and 250 kHz (dots). Nevertheless, regardless of the repetition frequency, the output power is less than 0.15 mW, and the pump beam Fp therefore cannot be injected directly into the microstructured fiber 14. It is for this reason that the mounting comprises the amplification means 22.

As a variant, the pump is a laser diode that is modulated externally by a modulator, for example of the electro-optical or acousto-optical type. This variant is less advantageous than the preceding variant that comprises an internal modulation to the extent that the electro-optical modulator limits the laser power of the beam Fp for low pulse durations, in particular because of continuous noise in the current state of the art. In addition, losses are generated as a function of the polarization of the pump beam, which causes instabilities that have a negative impact on the generation of the spectrum of the supercontinuum source 10 and reduces its service life.

The block B of FIG. 1, arranged at the output of block A, will now be described in detail.

The optical preamplifier module 24 comprises at least one doped optical fiber and a pumping source.

In FIG. 1, the module 24 comprises at least one stage and preferably two stages, each stage comprising a monomodal optical fiber 28 that is doped with ytterbium $Yb^{3+}$, with the two fibers 28 being pumped by the same so-called auxiliary monomodal pumping source 30 at 976 nm and delivering 200 mW of power, an optical circulator 32, and optical isolators 34 for ensuring the path of the beam in the preamplifier module. The module 24 also comprises a Bragg reflector 36 that selects a wide band of ±5 nm around 1,060 nm, and a narrow bandpass filter 38 for filtering the amplified spontaneous emission. Advantageously, the bandpass filter 38 is arranged after the optical circulator 32, which makes it possible to filter all of the amplified spontaneous emissions at the output of the preamplification module 24.

At the output of the block B, the beam denoted FB is amplified between 15 dB and 30 dB according to the repetition frequency and the pulse duration of the beam Fp.

FIG. 3 more precisely illustrates the power at the output of the block B, denoted P, as a function of the pulse duration T of the pump beam, for a repetition frequency respectively of 1 MHz (continuous line), 500 kHz (broken line), and 250 kHz (dots).

The mean power obtained at the output of the preamplifier module 24, on the order of 5 mW to 20 mW, is then sufficient to inject the beam that is obtained from the module 24 into the high-power amplifier module of block C.

The block C of FIG. 1, arranged at the output of the block B, will now be described in detail.

The amplifier module 26 of the block C comprises at least one auxiliary laser source 42 and an optical isolator 44.

According to one embodiment, the amplifier module 26 of the block C is an optical amplifier that comprises a double-sheath optical fiber 40 that is doped with ytterbium $Yb^{3+}$ and pumped by an auxiliary laser source of 42 to 976 nm and emitting 6.5 W of power. The fiber 40 has a core whose diameter is on the order of 5 μm.

The fiber has a length of 3.5 m, so as to limit the stimulated Raman diffusion, with the threshold power where this diffusion appears being inversely proportional to the length of the fiber.

The amplifier module makes it possible to obtain a high power of the beam Fc at the output of the block C between 1 W and 3 W, and preferably on the order of 3 W, regardless of the characteristics of the pulse duration and the repetition frequency, the value of 3 W representing the limit for the appearance of Raman diffusion.

It is noted that the Raman diffusion is not desirable to the extent that it is a non-linear phenomenon that unnecessarily consumes the energy that is obtained from the beam. The block D comprises the standard monomodal fiber 25 at 1,060 nm at the output of the amplification fiber 40, with a strong index coating of the weld between the amplification fiber 40 and the standard fiber 25 so as to empty the residue of the auxiliary pump, which makes it possible to recover only the useful signal at 1,060 nm and to avoid heating the fiber 25. Thus, the monomodal fiber 25 makes it possible to eliminate the multimodal pump residue that comes from the inner sheath of the fiber 40 but also to couple a maximum signal that comes from the core of this fiber 40 into the core of the non-linear microstructured fiber 14.

The characteristics of the laser source 12, measured at the output of the standard fiber 25, are now described in detail.

The spectrum that is illustrated in FIGS. 4A and 4B shows the power, denoted P, respectively on the log and linear scales, as a function of wavelength, denoted -, for a pulse duration of 2 ns for a repetition frequency of 500 kHz and comprises a primary peak 44 at 1,060 nm, with a width at mid-height of 7.4 nm, as well as a much smaller peak 46 with a wavelength on the order of 1,030 nm corresponding to the non-filtered, amplified spontaneous emission, and a very small peak 48 at 976 nm due to a small residue of the auxiliary pump.

FIG. 5 illustrates the calculated evolution of the peak value power, denoted Pc, as a function of the pulse duration of the pump beam, denoted T, for a repetition frequency of 1 MHz (continuous line), 500 kHz (broken line) and 250 kHz (dots). The peak value power is a decreasing function of the pulse duration and the repetition frequency, and is high, since it is encompassed between 3.5 kW and 7.5 kW.

Thus, the power that is generated by the source 12 makes possible the production of the supercontinuum source 10 by injection of the beam F at the input of the non-linear microstructured fiber 14 and propagation in the fiber 14.

The non-linear microstructured fiber 14 is now described in detail.

As illustrated in FIGS. 6A and 6B, the non-linear microstructured fiber 14 comprises a guide matrix of a given length in a so-called longitudinal guide direction, and a cross-section in a plane that is transverse to the guide direction, otherwise called index profile.

According to a nonlimiting embodiment, the fiber 14 has a silica base.

As a variant, the fiber 14 can be based on fluorinated glass (ZBLAN), chalcogenide glasses, tellurium oxide glasses, . . . .

The index profile comprises an arrangement of a set of holes with a diameter d whose centers of the holes are uniformly spaced by a distance -, otherwise called "step," arranged around a diameter core denoted c. Another parameter of the fiber is the air fraction that is defined by the ratio between the diameter d of the holes and the step -, i.e., d/-.

The parameters of the fiber 14 will be presented in detail later.

According to a preferred embodiment, the fiber 14 is a fiber that is doped with ytterbium $Yb^{3+}$ and equipped with an air sheath G, as illustrated in FIG. 6B.

At the output of the microstructured fiber 14, a very extended spectrum is generated, hence the term of supercontinuum source 10.

The supercontinuum source 10 emits pulses whose duration T' is approximately equal to the pulse duration T of the pump beam Fp. Thus, the means 16 for varying the pulse duration T' consist of the means for varying the pump laser source 20, already described. The duration T' is preferably between 200 ps and 2 ns.

According to another characteristic of the invention, the supercontinuum source 10 has a parameterizable consistency length. Actually, the consistency length depends on the pulse duration T', in such a way that the monitoring of the pulse duration T' makes it possible to monitor the consistency length of the source 10.

According to another characteristic of the invention, the supercontinuum source 10 has a very weak time dispersion, otherwise called a time jig, essentially because of the fact that the source 20 is a semi-conductive laser. The ratio between the time dispersion and the pulse duration is on the order of ±4% and preferably less than ±2%. Thus, the supercontinuum source 10 is temporally very stable, which ensures constant results during the use of the source.

According to another characteristic of the invention, the supercontinuum source 10 has a variable repetition frequency, approximately equal to the repetition frequency of the pump laser source 20. The repetition frequency is preferably between 250 kHz and 1 MHz, in particular for reasons of welding quality.

According to a first embodiment, the non-linear microstructured fiber 14 has the following characteristics: step - on the order of 3 μm and hole diameter d on the order of 1.5 μm with a zero of dispersion for 1,040 nm. The length of the fiber 14 is on the order of 30 m.

The spectrum that is obtained from this fiber 14 is illustrated in FIGS. 7A and 7B. FIG. 7A shows the spectral power density, denoted Ds, as a function of wavelength, denoted -, with the repetition frequency being fixed at 500 kHz for different pulse durations of between 171 ps and 2.12 ns.

As can be seen in this figure, the spectrum of the supercontinuum source 10 extends between 450 nm and 1,750 nm, or from the visible to the infrared, regardless of the pulse duration. The spectrum comprises a peak 52 at 1,060 nm and a residual peak 54 at 1,030 nm. It is noted that the spectral density increases with the pulse duration for wavelengths of greater than 800 nm.

FIG. 7B shows the spectral power density, denoted Ds, as a function of wavelength, denoted -, with the pulse duration being fixed at 2 ns, for a repetition frequency respectively of 1 MHz (continuous line), 500 kHz (broken line), and 250 kHz (dots). The spectrum comprises a peak 52 at 1,060 nm and a residual peak 54 at 1,030 nm. The spectral density increases with the repetition frequency for wavelengths that are greater than 800 nm.

According to a second embodiment, the non-linear microstructured fiber 14 has the following characteristics: step - on the order of 4 and holes diameter d on the order of 3 with a zero of dispersion for 992 nm.

As can be seen in FIG. 8, the spectrum of the supercontinuum source 10 extends between 400 nm and 1,750 nm, or from ultraviolet to infrared, regardless of the pulse duration, and with the repetition frequency being fixed at 500 kHz for different pulse durations of between 171 ps and 2.12 ns.

The spectrum comprises a peak 52 at 1,060 nm and a residual peak 54 at 1,030 nm. The spectral density increases with the pulse duration for wavelengths that are greater than 1,100 nm.

In this embodiment, the supercontinuum source 10 has a temporal jig of between 70 ns and 80 ns, and on average 74.7 ns, with six measurements having been taken for a repetition frequency of 500 kHz, with a jig respectively of 75.2 ns, 76 ns, 72.4 ns, 78 ns, 74.40 ns, and 72 ns. Thus, the supercontinuum source 10 has a very reduced temporal variation on the order of 3.8%.

According to another embodiment, the non-linear microstructured fiber 14 has the following characteristics: step - on the order of 2.62 μm, air fraction d/- of 0.6, and an air sheath. According to this same embodiment, the fiber 25 of the block D is eliminated, and the fibers 40 and 14 are directly welded together. It is noted that the fiber 14 with the air sheath is active and can then advantageously use the auxiliary pump residue that comes from the doped fiber 40 of the block C.

According to another embodiment, the fiber 40 of the block C is a microstructured fiber with an air sheath as described above, and the fibers 25 and 14 are eliminated, i.e., this fiber 40 with an air sheath implements both the amplification of the beam that is obtained from the preamplifier module and the expansion of the spectrum. In this case, the beam Fc corresponds to the beam F'.

It is noted that the effective preamplification implemented by the module 24 makes possible the use of a fiber 40 that has a small core in contrast to the conventionally used amplifying fibers. Because of the geometric properties of the fibers 40 and 25, the weld between the fibers 40 and 25, itself having a small core, is of better quality, which ensures the least loss possible and therefore an effective supercontinuum generation.

The invention also relates to a process for generating light waves extending from the infrared range to the ultraviolet range, consisting in generating a laser beam during a given pulse duration, in injecting said laser beam into a non-linear microstructured optical fiber, and in varying the pulse duration of the beam of the supercontinuum source.

According to another aspect of the invention, the spectral expansion can vary as a function in particular of the wavelength of the pump source 20, of the characteristics of the fiber 14 (type of fiber, material, . . . ) of the doping used.

To obtain a spectral expansion extending from the ultraviolet to the middle infrared, a pump source 20 will be selected with a wavelength of 1,060 nm and a microstructured silica fiber 14 and ytterbium Yb doping.

To obtain a spectral expansion extending from the visible to the beginning of the distant infrared, a pump source 20 will be selected with a wavelength of 1,550 nm and a fiber 14 made of silica, etc., of the standard or microstructured type, and erbium Er doping or erbium/ytterbium co-doping or a pump source 20 with a wavelength on the order of 2 μm and a fiber 14 made of silica, etc., of standard or microstructured type, and a thulium Tm doping or holmium Ho doping.

According to another characteristic of the invention, the pulse duration of the beam from the supercontinuum source is made to vary by varying the pulse duration of the laser beam.

The supercontinuum source 10 according to the invention has a variable pulse duration and consequently a parameterizable consistency length; therefore, it is thereby adaptable to the desired observations. It also advantageously has a variable repetition frequency, which makes it completely flexible with regard to the desired applications.

According to a preferred embodiment, the non-linear fiber also makes it possible to amplify the beam, which simplifies the mounting as described above. It is noted that the supercontinuum source is all fiber, which makes it particularly stable, compact and mobile.

The invention also relates to a light wave emission device extending from the infrared range to the ultraviolet range, characterized in that it comprises a supercontinuum source as described above and means for monitoring the synchronization of the supercontinuum source with a reference element. Thus, the monitoring means make it possible for the wave trains of the beam F' to be emitted in synchronization with the reference element.

These monitoring means are similar or incorporated in the means 16 for varying the pulse duration of the supercontinuum source 10. The reference element can be, for example, the passage of a biological cell into an analysis window.

The invention claimed is:

1. A supercontinuum source for emitting waves extending from the infrared range to the ultraviolet range, comprising:
a pulsed laser source (12) that, during a pulse duration (T), generates a laser beam (F) with a peak power value between 3.5 kW and 7.5 kW, the pulsed laser source (12) comprising
   i) a pulsed pump laser source (20) that that emits a pump beam (Fp) of variable pulse duration (T);
   ii) means (16) for varying said pulse duration (T), the means (16) for varying said pulse duration (T) being integrated in the pulsed pump laser source (20);
   iii) at least one stage preamplifier module (24) connected to an output side of said pulsed pump laser source (20), said preamplifier module (24) amplifying the pump beam (Fp),
   wherein each stage comprises an optical fiber (28), an auxiliary pumping source (30) that pumps the optical fiber, an optical circulator (32) connected to an output of the optical fiber (28), and a narrow bandpass filter (38) located on an output side of the optical circulator (32) to filter amplified spontaneous emissions at the output of the preamplifier module (24), and
   iv) an amplifier module (26) connected to an output side of said preamplifier module (24), and comprising
   a) an optical isolator (44) having an input connected to the output of said preamplifier module (24),
   b) an auxiliary laser source (42) with an output connected to an input of said optical isolator (44), and
   c) an active non-linear microstructured doped optical fiber, comprising an air clad (G), connected to the output of the auxiliary laser source (42) and the output of the optical isolator (44) to thereby provide an amplifying and non-linear fiber,
   wherein i) an input of said non-linear microstructured doped optical fiber (40) receives said pump beam (Fp) of variable pulse duration (T) from an amplifier output formed by the output of said auxiliary laser source (42) and the output of the optical isolator (44), and ii) an output of said non-linear microstructured doped optical fiber (40) generates, during a pulse duration (T'), a laser beam (F') during the pulse duration (T') extending from the infrared range to the ultraviolet range.

2. The supercontinuum source according to claim 1, wherein the pump source (20) is a semi-conductive laser.

3. The supercontinuum source according to claim 1, further comprising a monomodal fiber (25) located between the amplifier output of the amplifier module (26) and a further non-linear microstructured doped optical fiber (14).

4. The supercontinuum source according to claim 3, wherein said non-linear microstructured doped optical fiber (40) is a double-sheath optical fiber (40) connected between the amplifier output of the amplifier module (26) and an input of the monomodal fiber (25), the monomodal fiber (25) being a standard fiber at 1,060 nm with a strong index coating.

5. The supercontinuum source according to claim 1, wherein the preamplifier module (24) amplifies the pump laser beam (Fp) between 15 dB and 30 dB.

6. The supercontinuum source according to claim 1, wherein each of the two stages of the preamplifier module comprise an respective optical isolator (34) at an input of the respective optical fiber (28) for ensuring a path of the beam in the preamplifier module, and one of the stages of the preamplifier module further comprises a Bragg reflector (36) arranged according to the optical circulator (32).

7. The supercontinuum source according to claim 1, wherein the amplifier module (26) amplifies the pump beam received from the output of the preamplifier module (24) to a power of between 1 W and 3 W at the output of the amplifier module (26).

8. The supercontinuum source according to claim 1, wherein the supercontinuum source has a variable repetition frequency.

9. Device for emission of light waves between the infrared range and the ultraviolet range, comprising the supercontinuum source according to claim 1, and means for monitoring synchronization of the supercontinuum source with a reference element.

* * * * *